United States Patent [19]

Thies et al.

[11] Patent Number: 5,199,989

[45] Date of Patent: Apr. 6, 1993

[54] POWDER BOOTH FLOOR WIPING MECHANISM

[75] Inventors: Michael J. Thies; Jeffrey W. Hale, both of Indianapolis; Christopher R. Merritt, Noblesville, all of Ind.

[73] Assignee: Ransburg Corporation, Indianapolis, Ind.

[21] Appl. No.: 738,802

[22] Filed: Jul. 31, 1991

[51] Int. Cl.$^5$ .................. B05B 15/12; B05C 15/00
[52] U.S. Cl. .................. 118/309; 118/312; 15/93.1; 15/98
[58] Field of Search ............ 118/309, 312, 326, 634, 118/DIG. 7; 55/290, DIG. 46; 15/93.1, 98; 454/50

[56] References Cited

U.S. PATENT DOCUMENTS

| | | | |
|---|---|---|---|
| 2,841,073 | 7/1958 | Forshee | 98/115 |
| 2,875,680 | 3/1959 | Forshee | 98/115 |
| 3,252,401 | 5/1966 | Smith | 98/115 |
| 3,395,972 | 8/1968 | Hardison | 118/326 |
| 3,690,298 | 9/1972 | Venturi | 118/629 |
| 3,691,991 | 9/1972 | Luderer et al. | 118/629 |
| 3,724,755 | 4/1973 | Diamond et al. | 239/15 |
| 3,744,450 | 7/1973 | Hardy | 118/326 |
| 3,777,706 | 12/1973 | Kaufman | 118/603 |
| 3,814,002 | 6/1974 | Rombach et al. | 98/115 SB |
| 3,870,016 | 3/1975 | Schneider | 118/309 |
| 3,899,311 | 8/1975 | Rapp | 55/283 |
| 3,902,455 | 9/1975 | Lehmann et al. | 118/630 |
| 3,905,785 | 9/1975 | Fabre | 55/96 |
| 3,918,641 | 11/1975 | Lehmann et al. | 239/15 |
| 4,057,257 | 11/1977 | Berg | 277/4 |
| 4,094,654 | 6/1978 | Prinzing | 55/290 |
| 4,121,840 | 10/1978 | Berg | 227/4 |
| 4,245,551 | 1/1981 | Berkmann | 98/115 SB |
| 4,257,345 | 3/1981 | Brice | 118/634 |
| 4,277,260 | 7/1981 | Browning | 55/273 |
| 4,354,451 | 10/1982 | Vohringer et al. | 118/326 |
| 4,357,900 | 11/1982 | Buschor | 118/681 |
| 4,378,728 | 4/1983 | Berkmann | 98/115 SB |
| 4,401,445 | 8/1983 | Browning | 55/96 |
| 4,409,009 | 10/1983 | Lissy | 55/302 |
| 4,430,956 | 2/1984 | Koch, II | 118/326 |
| 4,471,715 | 8/1984 | Gubler et al. | 118/324 |
| 4,506,625 | 3/1985 | Vohringer | 118/312 |
| 4,545,324 | 10/1985 | Browning | 118/634 |
| 4,715,314 | 12/1987 | Ramseier et al. | 118/631 |
| 4,764,220 | 8/1988 | Dinkel et al. | 134/6 |
| 4,852,513 | 8/1989 | Hayes | 118/326 |

FOREIGN PATENT DOCUMENTS

| | | |
|---|---|---|
| 0402604A2 | 12/1990 | European Pat. Off. |
| 7015283 | 8/1970 | Fed. Rep. of Germany |
| 2835474 | 2/1980 | Fed. Rep. of Germany |
| 2134775 | 10/1980 | Fed. Rep. of Germany |
| 7634370 | 11/1976 | France |
| 1020591 | 2/1966 | United Kingdom |
| 1315671 | 5/1973 | United Kingdom |

OTHER PUBLICATIONS

PCT/GB86/00447 Published Feb. 12, 1987.

Primary Examiner—W. Gary Jones
Assistant Examiner—Charles K. Friedman
Attorney, Agent, or Firm—Barnes & Thornburg

[57] ABSTRACT

A pulverulent coating material application and reclaiming system comprises a booth including a floor, a pair of opposed side walls and a pair of opposed ends. Articles to be coated are conveyed through the booth between the walls and above the floor for coating by the pulverulent material. A dispenser dispenses pulverulent material onto the articles as they are conveyed through the booth. A receptacle is provided under the floor for reclaiming pulverulent material which does not adhere to the articles. The floor terminates short of ends of the booth to define adjacent to the ends entries to the receptacle for reclaimed pulverulent material. A floor wiping mechanism includes a wiper, low friction mountings on the wiper to permit low friction movement of the wiper on the floor, scraping blades mounted on the wiper in contact with the floor, and a prime mover for reciprocating the wiper at intervals lengthwise of the floor to return pulverulent material accumulated on the floor therefrom into the entries.

9 Claims, 3 Drawing Sheets

POWDER BOOTH FLOOR WIPING MECHANISM

This invention relates to floor wiping mechanisms for wiping the floors of booths in which articles are coated by coating powders. Typically, because of the cost of such coating powders and because of the necessity to clean up over-sprayed powder in any event, such booths are provided with powder overspray recovery systems. Various types of such systems are known. Some such systems are illustrated in U.S. Pat. Nos.: 4,852,513; 4,764,220; 4,715,314; 4,545,324; 4,506,625; 4,471,715; 4,430,956; 4,409,009; 4,401,445; 4,378,728; 4,357,900; 4,354,451; 4,277,260; 4,257,345; 4,245,551; 4,094,654; 3,918,641; 3,905,785; 3,902,455; 3,899,311; 3,870,016; 3,814,002; 3,777,706; 3,744,450; 3,724,755; 3,691,991; 3,690,298; 3,395,972; 3,252,401; 2,875,680; and, 2,841,073; and the following international and foreign patent publications: PCT/GB86/00447; EP 0 402 604 A2; British Patent Specification 1,315,671; British Patent Specification 1,020,591; German OLS 2,835,474; German AS 2,134,775; German GM 70 15,283; and, French Patent Application 76 34,370.

According to one aspect of the invention, a pulverulent coating material application and reclaiming system comprises a booth including a floor, a pair of opposed side walls and a pair of opposed ends. Means are provided for conveying articles to be coated through the booth between the walls and above the floor for coating by said pulverulent material. A dispenser dispenses pulverulent material onto articles as they are conveyed through the booth. A receptacle under the floor reclaims pulverulent material dispensed by said dispenser but not adhering to the articles. The floor terminates short of at least one of the ends to define adjacent said one of said ends an entry to the receptacle for the reclaimed pulverulent material. A floor wiping mechanism includes a wiper member, low friction means for mounting on the wiper member to permit low friction movement of the wiper member on the floor, scraping means, means for mounting the scraping means on the wiper member in contact with the floor, and means for coupling the wiper member to a prime mover for reciprocating the wiper member at intervals lengthwise of the floor to return pulverulent material accumulated on the floor therefrom into the entry.

According to another aspect of the invention, a floor wiping mechanism is provided for a pulverulent coating material application and reclaiming system comprising a booth including a floor, a pair of opposed side walls and a pair of opposed ends, the floor terminating short of at least one of said ends to define adjacent said one end an entry to a receptacle for reclaimed pulverulent material underlying the floor. The mechanism includes a wiper member, low friction means for mounting on a bottom surface of the wiper member to permit low friction movement of the wiper member on the floor, scraping means, means for mounting the scraping means on the wiper member in contact with the floor, and means for coupling the wiper member to a prime mover for reciprocating the wiper member at intervals lengthwise of the floor to return pulverulent material accumulated on the floor therefrom into said entry.

According to an illustrative embodiment, the floor terminates short of both ends to define adjacent each of the ends an entry to the receptacle, and the prime mover reciprocates the wiper member at intervals alternately toward said one end and toward the other end lengthwise of the floor to return pulverulent material accumulated on the floor therefrom into one or the other of the entries.

Additionally according to an illustrative embodiment, the prime mover comprises a double purchase pneumatic cable cylinder and the wiper member includes means for attachment to the ends of the cable of the cable cylinder so that actuation of the cable cylinder in a first direction pulls the wiper member in a first direction along the floor, and actuation of the cable cylinder in a second direction pulls the wiper member in a second direction along the floor.

Further, illustratively, the cable cylinder is mounted on the outside of one of the side walls a approximately floor level.

Additionally, illustratively, the mechanism further comprises low friction side shoes for mounting on the wiper member between the wiper member and the booth side walls for reducing friction between the booth side walls and the wiper member as the wiper member is moved relative to the booth floor.

Further, illustratively, the scraping means comprises resilient strips of material and means for attaching the resilient strips of material to surfaces of the wiper member which face the ends. According to an illustrative embodiment, the resilient strips comprise rubber strips and the means for attaching the resilient strips to the surfaces of the wiper member which face the ends comprises metal wiper retainer strips and threaded fasteners extending through the metal wiper retainer strips and the resilient strips and into threaded openings provided therefor in surfaces of the wiper member which face the ends.

BRIEF DESCRIPTION OF THE DRAWINGS

The invention may best be understood by referring to the following description and accompanying drawings which illustrate the invention. In the drawings.

Figure 1:
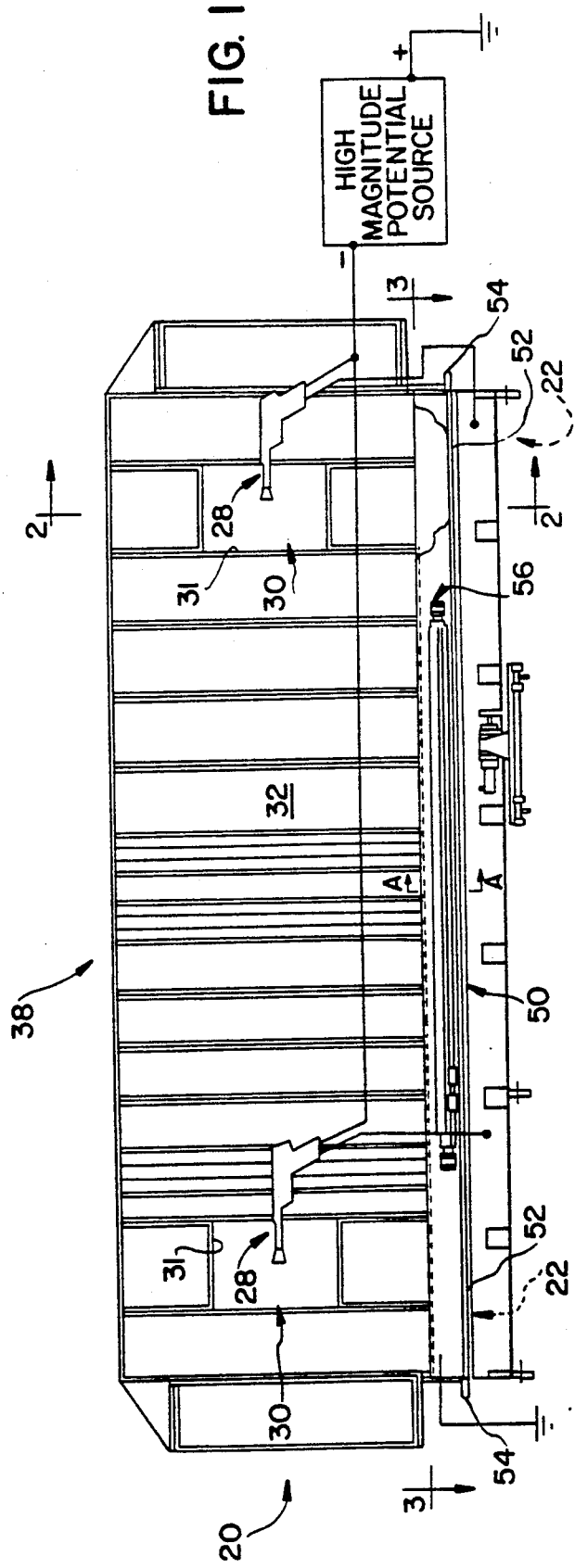
FIG. 1 illustrates a side elevational view of a powder coating application booth.
Figure 3:
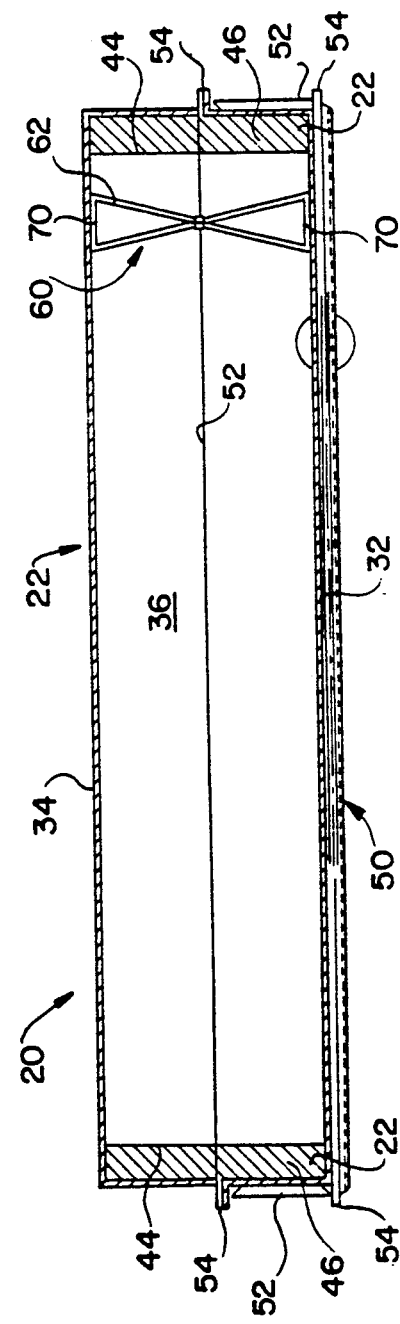
FIG. 3 illustrates a sectional plan view of the booth of FIGS. 1-2 taken generally along section lines 3—3 of FIGS. 1-2.
Figure 2:
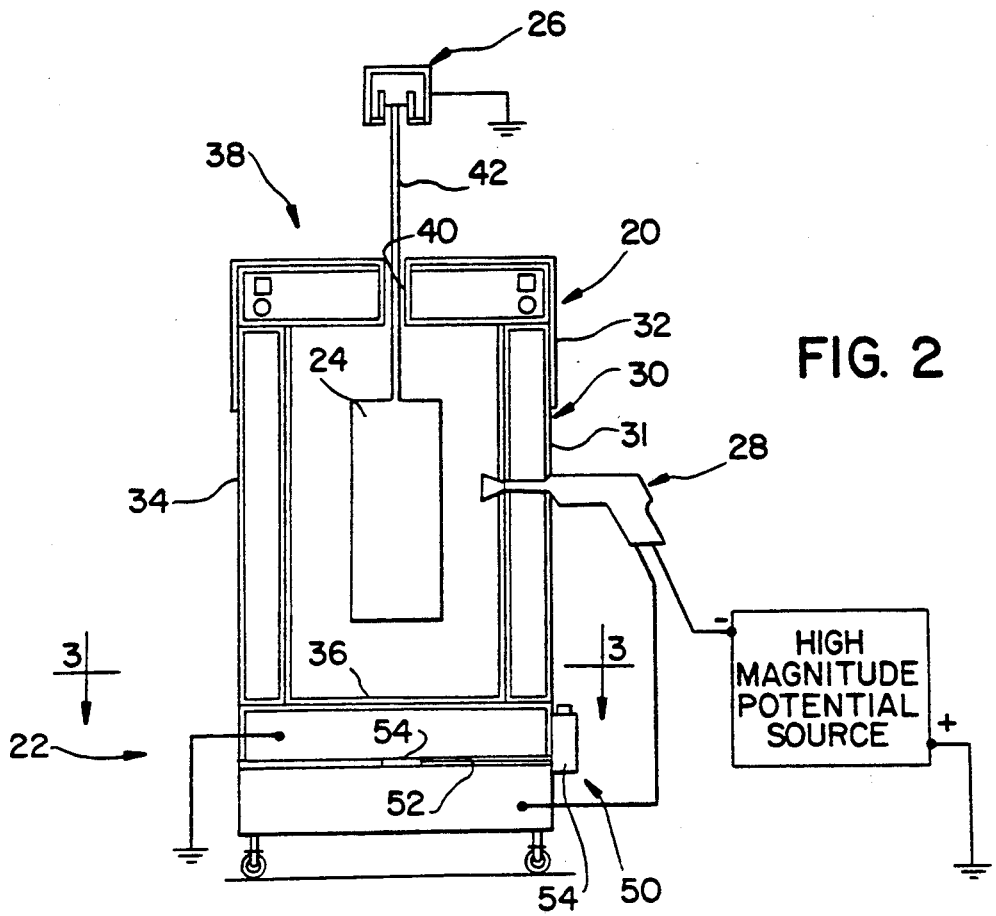
FIG. 2 illustrates an end elevational view of the booth of FIG. 1 taken generally along section lines 2—2 of FIG. 1.

Referring now particularly to FIGS. 1-3, a coating material application booth 20 includes a powder fluidizing hopper 22 at each of its ends into which powder to be dispensed is deposited. The powder is then fluidized and dispensed onto articles 24 which are conveyed through booth 20 on an overhead conveyor 26. Occasionally, the powder in hoppers 22 must be replenished, but oversprayed powder, that powder which is not ultimately deposited on the articles 24, is continuously recovered and recirculated by the system of the present invention back through the hoppers 22 to the powder spray guns 28 positioned at two spray stations 30 for spraying through openings 31 in a sidewall 32 of booth 20.

Booth 20 includes longitudinally extending sidewall 32, a parallel sidewall 34 on the opposite side thereof, a floor 36, and a roof 38. Roof 38 is split at 40 to accommodate the hangers 42 on which articles 24 are conveyed through booth 20 on conveyer 26. Floor 36 terminates at each of its ends 44 several inches from the ends of booth 20, leaving an open space 46 at each end thereof through which oversprayed powder deposited on floor 36 is returned to hoppers 22 by the recovery system of the present invention.

A double purchase pneumatically driven cable cylinder 50 is mounted on the outside of wall 32 at about floor 36 level. Cylinder 50 is of the type described in, for example U.S. Pat. Nos. 4,057,257 and 4,121,840, and illustratively is a model 200-25AT2DP cable cylinder available from Tol-O-Matic, Inc., 1028 South Third Street, Minneapolis, Minn., 55415. The cylinder cable 52 extends from each end of cylinder 50 over a pair of wiper pulley assemblies 54 mounted at each of wall 32's ends and then into booth 20. Within booth 20, the cylinder cable 52 extends longitudinally of booth 20 just above floor 36 level. At a point along the length of cable 52 which, in operation of the system, is always outside booth 20, cable 52 includes an automatic cable tensioner 56.

Figure 6:
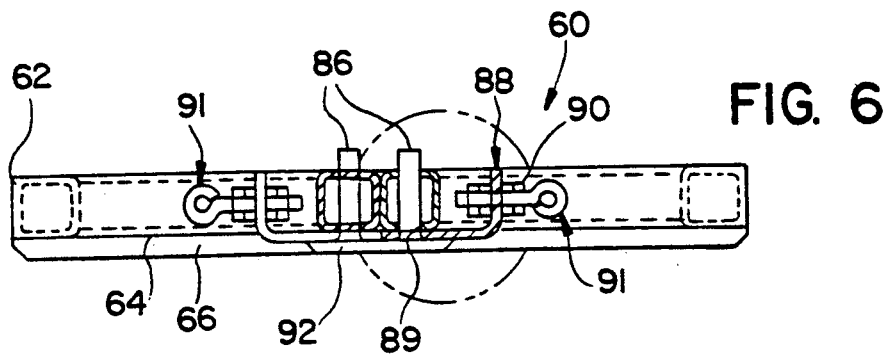
Figure 4:
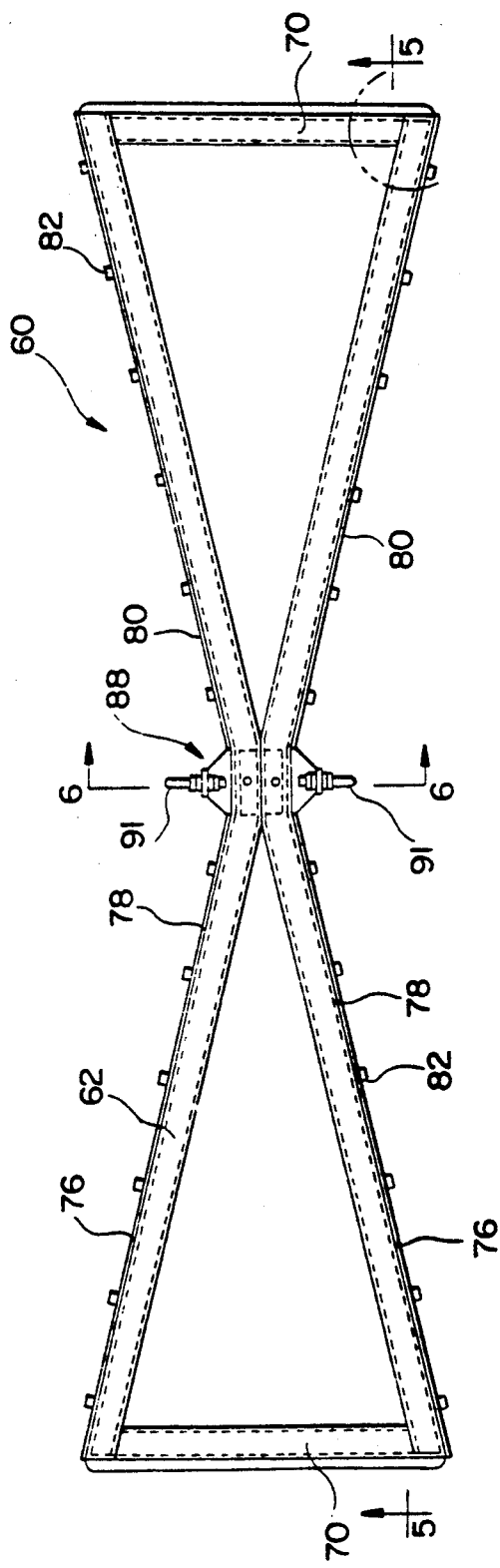
FIG. 4 illustrates a much enlarged top plan view of a detail of FIG. 3.
Figure 5:
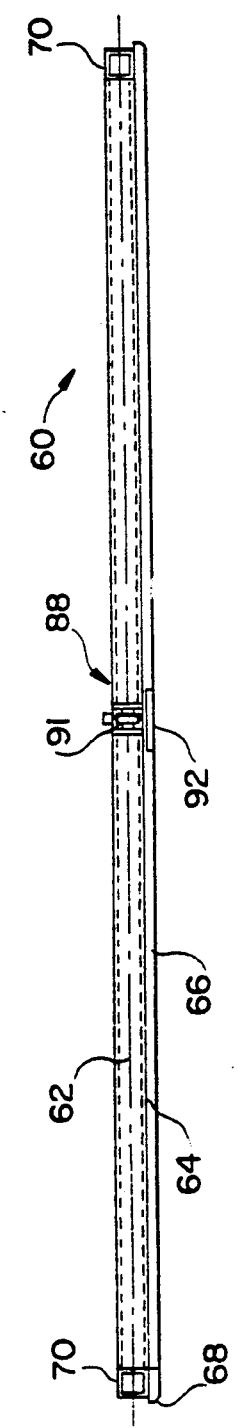
FIG. 5 illustrates a partly fragmentary elevational view of the detail of FIG. 4 taken generally along section lines 5—5 thereof; and, FIG. 6 illustrates a partly fragmentary elevational view of the detail of FIG. 4 taken generally along section lines 6—6 thereof.

A wiper assembly 60, best illustrated in FIGS. 4–6, is mounted on cable 52 at a position which is always inside booth 20 when the system is operating. As best illustrated in FIGS. 2 and 4, assembly 60 includes a frame 62 constructed from hollow, square cross section tubing. Frame 62 is somewhat bowtie-shaped in plan view. The underside surface 64 of frame 62 is covered by a polytetrafluoroethylene (PTFE) wiper bottom shoe 66 which is mounted to frame 62 by appropriately spaced flat head countersunk screws 68. Shoe 66 eases sliding of assembly 60 along floor 36. Shoe 66 extends outwardly beyond the end rails 70 of frame 62, which extend longitudinally of booth 20, generally into contact with the inner surfaces of walls 32, 34 of booth 20. Running clearance is provided between shoe 66 and the inner surfaces of walls 32, 34. This eases sliding of assembly 60 in contact with walls 32, 34. Scraping of oversprayed powder from floor 36 and return of this oversprayed powder through openings 46 to hoppers 22 is achieved by rubber wiper strips 76 mounted on the outwardly facing vertical surfaces 78 of frame 62. Strips 76 extend down into contact with floor 36 when frame 62 rests on the floor 36. Strips 76 are mounted to surfaces 78 by steel wiper retainer strips 80 and appropriately spaced hex head countersunk screws 82 and washers.

Frame 62 is mounted on clevis 88 by slipping frame 62 down onto clevis pins 86 with which clevis 88 is provided. Vertically extending aligned openings 89 are provided in the center of frame 62 for pins 86. Frame 62 is retained on pins 86 by gravity, but additional retention means, such as cotter pins (not shown), can be provided as required by the needs of a particular application.

Each end of the cable 52 is passed through the eye of an eye bolt 91 in an opening 90 provided therefor in clevis 88. A loop is then formed in each end of cable 52 and clamped with a cable clamp (not shown). Each eye bolt 91 is provided with adjusting and jamb nuts on both sides of clevis 88 to provide for tensioning of the cable 52. Clevis 88 is provided with its own friction-reducing PTFE shoe 92 which is mounted on clevis 88 by flat head countersunk screws 68.

In operation, as powder spray guns 28 dispense powder from hopper 22 onto articles 24, overspray is deposited on floor 36. At established time intervals, cable cylinder 50 executes a stroke of operation, moving the wiper frame 62 attached to driving cable 52 the length of floor 36. Accumulated overspray on floor 36 is pushed ahead of frame 62 by the leading one of wipers 76 into a respective one of openings 46, returning the powder to fluidizing hopper 22 to be recycled.

The mounting of frame 62 on clevis pins 86 provides a simple mechanism for removing frame 62 for thorough cleaning of booth 20, for example, prior to a change in the powder coating color. Frame 62 is simply lifted from pins 86 for removal.

The use of a pneumatic prime mover 50 provides an added benefit over prior art mechanically (chain) linked systems. In such prior art systems, some mechanism such as a cotter pin was provided in one of the links of the drive mechanism. If a jam or other obstruction of the movement of the powder recovery mechanism was encountered, the pin was sheared to prevent damage to the drive mechanism. The pneumatic prime mover 50 simply stalls when the movement of the powder recovery frame 62 is obstructed, and no damage is done to frame 62, clevis 88 or the cable 52 which connects clevis 88 to cable cylinder 50.

What is claimed is:

1. A pulverulent coating material application and reclaiming system comprising a booth including a floor, a pair of opposed side walls and a pair of opposed ends, means for conveying articles to be coated through the booth between the walls and above the floor for coating by said pulverulent material, a dispenser for dispensing said pulverulent material onto said articles as they are conveyed through the booth, a receptacle under said floor to which pulverulent material dispensed by said dispenser but not adhering to said articles can be returned for reclaiming, said floor terminating short of both of said ends to define adjacent each of said ends an entry to said receptacle for said reclaimed pulverulent material, and a floor wiping mechanism, the mechanism including a wiper member, low friction means for mounting on the wiper member to permit low friction movement of the wiper member on the floor, scraping means, means for mounting the scraping means on the wiper member in contact with the floor, and means for coupling the wiper member to a prime mover for reciprocating the wiper member at intervals lengthwise of the floor alternately toward one or the other of said ends to return pulverulent material accumulated on the floor therefrom alternately into one or the other of said entries.

2. The system of claim 1 wherein the prime mover comprises a double purchase pneumatic cable cylinder and the wiper member includes means for attachment to the ends of the cable of the cable cylinder so that actuation of the cable cylinder in a first direction pulls the wiper member in a first direction along the floor, and actuation of the cable cylinder in a second direction pulls the wiper member in a second direction along the floor.

3. The system of claim 2 wherein the cable cylinder is mounted on the outside of one of the side walls at approximately floor level.

4. A floor wiping mechanism for a pulverulent coating material application and reclaiming system comprising a booth including a floor, a pair of opposed side walls and a pair of opposed ends, said floor terminating short of both of said ends to define adjacent each of said ends an entry to a receptacle for reclaimed pulverulent material underlying said floor, the mechanism including a wiper member, low friction means for mounting on a bottom surface of the wiper member to permit low friction movement of the wiper member on the floor, scraping means, means for mounting the scraping means on the wiper member in contact with the floor, and means for coupling the wiper member to a prime mover for reciprocating the wiper member at intervals lengthwise of the floor alternately toward one or the other of said end to return pulverulent material accumulated on the floor therefrom alternately into one or the other of said entries.

5. The mechanism of claim 4 wherein the prime mover comprises a double purchase pneumatic cable cylinder and the wiper member includes means for attachment to the ends of the cable of the cable cylinder so that actuation of the cable cylinder in a first direction pulls the wiper member in a first direction along the floor, and actuation of the cable cylinder in a second direction pulls the wiper member in a second direction along the floor.

6. The mechanism of claim 4 wherein the wiper member comprises a frame and means for mounting the low friction means on the bottom of the frame to lie between the frame bottom and the floor.

7. The mechanism of claim 6 and further comprising low friction side shoes for mounting on the frame between the frame and the booth side walls for reducing friction between the booth side walls and the frame as the frame is moved relative to the booth floor.

8. The mechanism of claims 4, 5, 6 or 7 wherein the scraping means comprises resilient strips of material and means for attaching the resilient strips of material to surfaces of the frame which face the ends.

9. The mechanism of claim 8 wherein the resilient strips comprise rubber strips and the means for attaching the resilient strips to the surfaces of the frame which face the ends comprises metal wiper retainer strips and threaded fasteners extending through the metal wiper retainer strips and the resilient strips and into threaded openings provided therefor in surfaces of the frame which face the ends.

* * * * *